United States Patent [19]
Christner

[11] Patent Number: 5,259,665
[45] Date of Patent: Nov. 9, 1993

[54] BRAKE CONTROL APPARATUS

[76] Inventor: Oval F. Christner, 3596 Prudence Dr., Sarasota, Fla. 34235

[21] Appl. No.: 932,293

[22] Filed: Aug. 20, 1992

Related U.S. Application Data

[63] Continuation-in-part of Ser. No. 688,267, Apr. 22, 1991.

[51] Int. Cl.[5] ............................ B60T 7/12; B60T 17/16
[52] U.S. Cl. .................................. 303/9.69; 188/1.11; 188/353; 303/DIG. 4
[58] Field of Search ............... 188/265, 353, 189, 1.11; 192/1.31–1.35; 303/39.69, 24.1, 89, 2, DIG. 2, DIG. 3, DIG. 4, 91

[56] References Cited

U.S. PATENT DOCUMENTS

| | | | |
|---|---|---|---|
| 2,701,035 | 2/1955 | Leichsenring | 188/353 |
| 2,904,134 | 9/1959 | Cieply | 192/1.33 X |
| 3,433,336 | 3/1969 | Mizuno | 192/1.32 |
| 3,645,352 | 2/1972 | Stark et al. | 188/353 X |
| 3,684,049 | 8/1972 | Kimura | 303/24.1 X |
| 3,872,953 | 3/1975 | Taylor | 188/353 |
| 3,893,698 | 7/1975 | Fontaine | 192/1.33 X |
| 3,895,698 | 7/1975 | Fontaine | 192/1.33 |
| 4,446,950 | 5/1984 | Wise et al. | 303/20 X |
| 4,579,202 | 4/1986 | McIntosh | 192/1.35 X |
| 4,865,175 | 9/1989 | Hirako et al. | 192/1.33 X |

FOREIGN PATENT DOCUMENTS

| | | | |
|---|---|---|---|
| 351657 | 1/1990 | European Pat. Off. | 188/1.11 |
| 2446793 | 4/1975 | Fed. Rep. of Germany | 188/1.11 |
| 2315087 | 1/1977 | France | 188/1.11 |
| 184050 | 10/1984 | Japan | 188/1.11 |
| 608143 | 1/1985 | Japan | 192/1.31 |
| 60460 | 3/1989 | Japan | 188/1.11 |

Primary Examiner—Robert J. Oberleitner
Assistant Examiner—Alfred Muratori

[57] ABSTRACT

A brake holding apparatus for vehicles with conventional hydraulic systems for the purpose of locking the least loaded brakes only, after the vehicle has been braked to a stop which permits unloading, during stops, the most loaded brakes, thereby prolonging their life and making driving easier for the operator. A hold mode indicator light is provided to alert the driver that the system is in the holding mode.

8 Claims, 1 Drawing Sheet

BRAKE CONTROL APPARATUS

This application is a CIP of Application Ser. No. 07/688,267 filed Apr. 22, 1991, now abandoned.

FIELD OF THE INVENTION

This invention relates to a brake control apparatus for vehicles with conventional hydraulic brake systems.

DISCUSSION OF PRIOR ART

Patents have been issued in this area for a considerable length of time. Among the first was the Sprenkle 5-1939 #U.S. Pat. No. 2,217,141 classification 192/13. Before that date and up to the present, applicant has not been able to find in applicant's searching a single prior patent that meets applicant's claim or is even similar to applicant's claim or the operation of applicant's invention. In over 100 patents to now, insofar as applicant can determine, not very many met the need that exists—proof of which is their lack of use or installation on vehicles either new or used.

Fontaine '3698, does not disclose the existence of the least or most loaded brake wheels. With this lack of definition, if you used the most loaded wheels for holding, you would have accomplished absolutely nothing over holding all four wheels. Nor does he disclose any kind of indicator system to permit the operator to make maximum use of the real advantages that are there.

For the purpose of proper definition of brake components, only "least loaded" and "most loaded" terms can fit to locate various parts of this brake holding system. "Front" and "rear" will not suffice.

In Fontaine '3868, the operating part of this patent has more than 17 solenoids, resistors, switches and connections which would be difficult to construct and maintain and very hard to troubleshoot. Applicant's invention requires 2 switches and one relay which would be simple to construct and service. Additionally, a vacuum operated system would be useless if the engine stopped.

Applicant uses control features that others use which are no doubt in the public domain but with far better results that are needed. Most prior art is patenting very complicated and expensive control valves that are not economically feasible with complicated fluid flow paths that would be difficult in the field from a service standpoint, ie. to remove air from the fluid system after installation and after servicing. Applicant's invention uses off-the-shelf components in the main and would be less expensive than anything applicant has seen in patent searches.

OBJECTS AND ADVANTAGES

The object of applicant's invention is to protect components of the most loaded brakes from needless deterioration. Driving in city traffic is easier for the operator; the design and use of all components is simpler and less expensive; the system is fail-safe in that any power interruption shuts down completely thereby reverting to the regular brake system.

Most prior art objectives apparently were to lock the brake systems, not specifically certain parts of it for very specific reasons such as applicant's and required, in almost all cases, very complicated and expensive controllers. Some require pressing brake pedal to release locked brakes and some require electric power to release locked brakes, a rather awkward situation. It is somewhat difficult to put into words the vast differences between applicant's invention and the others.

Anti-creep, anti-roll are objects of most inventors and most would meet that objective in some manner. Applicant's system would have that capability as well.

DESCRIPTION OF INVENTION

FIG. 1

Figure 1:
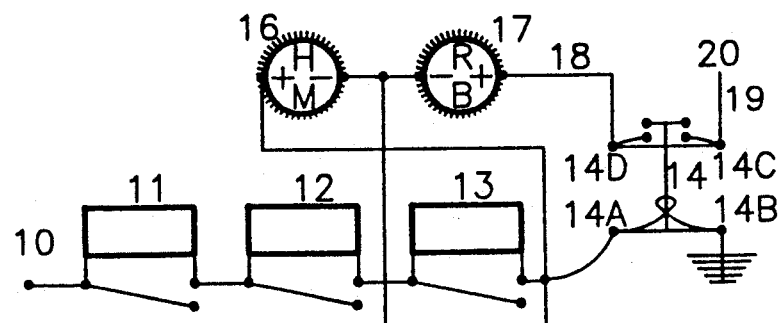
FIG. 1 is a circuit diagram of system of switches showing their interconnections.
Figure 2:
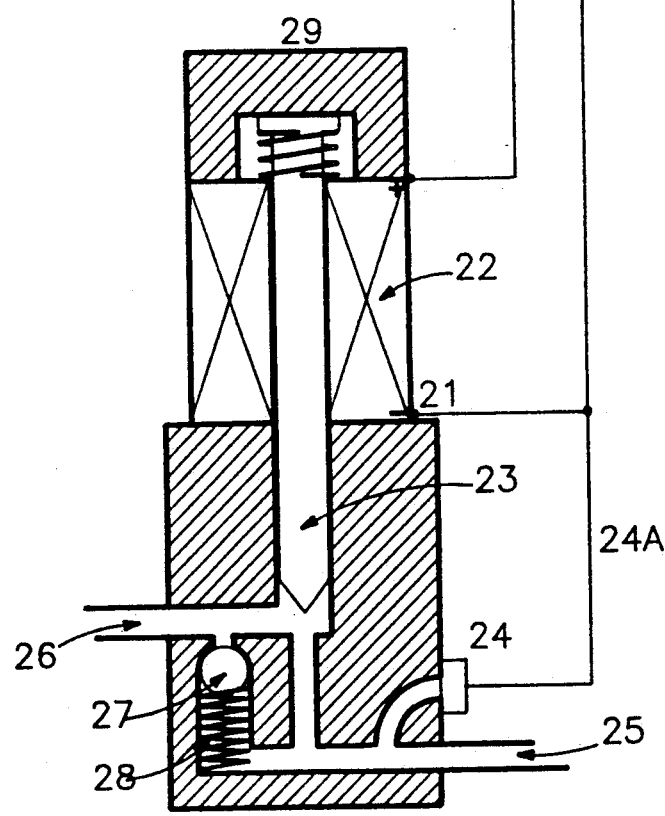
FIG. 2 is a cross section of the electromagnetic valve with one-way check valve.

No. 10 is a vehicle ignition terminal.

No. 11 is a system on-and-off switch.

No. 12 is a throttle pedal switch with perceptible on-off feel.

No. 13 is a stand-still switch.

No. 14 is a circuit lead to control valve and brake release and hold mode light relay.

No. 15 is a lead to ground pressure switch, relay switch, and indicator lights.

No. 16 is a relay to brake release light from vehicle brake light circuit.

No. 17 is vehicle brake light circuit.

No. 18 is a hold mode indicator light.

No. 19 is a brake release indicator light.

No. 20 is a relay switch.

No. 21 is a circuit from relay to release brake light.

FIG. 2

No. 22 is a complete control valve.

No. 23 is a brake fluid passage to brake master cylinder.

No. 24 is a brake fluid passage to least loaded brake assembly.

No. 25 is a magnetic valve plunger.

No. 26 is a control valve coil.

No. 27 is a pressure to ground switch to circuit #15.

No. 28 is a check valve assembly to prevent fluid movement from no. 24 to no. 23 when magnetic valve is closed and to increase pressure in no. 24 if desired.

No. 29 is a coil ground.

OPERATION OF INVENTION

One embodiment

With this holding apparatus, operator can and should depress brake pedal when cranking engine (but does not necessarily have to). When engine is running, holding mode indicator light and brake release light will come on and vehicle will be held by fluid pressure to the least loaded brakes. Thus, the vehicle will not move even if operator releases the brake pedal and shifts the transmission into drive (a safety feature) until the throttle is pressed.

When braking from speed, throttle pedal release will close switch 12 and at standstill switch 13 will close, thus energizing line 14 and control valve assembly, thereby vehicle will be in holding mode (such as at stop signals) with both hold mode and release brake lights lit. The brake pedal release light can then be used to teach operator to make maximum use of system by releasing brake. Operator needs to do nothing but depress the throttle to go again.

With this consummate action the most loaded wheel brakes would then retract brake pads completely from contact with brake rotor, thus greatly minimizing rotor warpage. In this manner, the brake rotor can and will cool by air thru ventilation passages and by conduction to its hub and wheel assembly evenly.

No heat from the rotor will have been conducted to caliper assembly causing deterioration of those components.

Another embodiment would be to use for switching purposes the vehicle on-board computer and anti-lock braking capabilities on so equipped vehicles.

Almost all driving, with this invention, would not be significantly different except during traffic stops you would not have to hold your foot on the brake and certainly would not want to do so. After stopping if the operator wanted to return to a creep, such as in very slow moving traffic, a slight movement of 12 as evidenced by feel would release holding system and permit vehicle to move as desired.

A further advantage of most loaded brakes unloaded at idle would be less transmission of engine and accessory noise to vehicle using the wheel as a microphone when the most loaded brakes are in the front and near the engine of a front engine vehicle.

The brake rotor warping is so bad that few brake repair establishments will replace brake pads without truing rotors and some auto manufacturers advise replacing rotors when the pads are replaced, certainly a terrible waste.

SUMMARY, RAMIFICATION AND SCOPE

The reader can see that this invention would be very desirable an all passenger vehicles -- especially those that would be used in city traffic.

This invention would work well on manual transmission vehicles, especially in protecting the most loaded wheel brakes and components.

While the above description contains many specificities, these should not be construed as limitations on the scope of the invention, but rather as an exemplification of the above preferred embodiments thereof. Many other variations are possible. For example, indicator lights on the dashboard could indicate position of all switches if that was desired.

Accordingly, the scope of the invention should be determined not by the embodiments illustrated, but by the appended claims and their legal equivalents.

Having thus described my invention, I claim:

1. An apparatus for a vehicle, having in combination, a master cylinder with a brake pedal, a hydraulic braking system with more than one least loaded brake wheel and more than one most loaded brake wheel whereon the improvement consists of means to hold hydraulic pressure in the said least loaded brake wheels while releasing pressure in the said most loaded brake wheels after the brake pedal has been pressed, comprising a solenoid control valve between the vehicle master cylinder and the said least loaded brake wheels permitting flow in both directions when not energized but trapping pressure in the said least loaded brake wheels when energized with a one way check valve incorporated in said solenoid control valve to permit flow to least loaded brake wheels if needed when said solenoid control valve is energized, a pressure activated grounding switch incorporated in said solenoid control valve to furnish ground to said solenoid control valve, to a release brake light, and to a holding mode light when pressure exists in the least loaded brake wheel, a manually operable systems on-off switch, a throttle pedal switch, a standstill switch, a relay switch and their electrical interconnections.

2. An apparatus according to claim 1 further comprising said manually operable systems on-off switch to make or break current from vehicle ignition terminal to said throttle pedal switch.

3. An apparatus according to claim 1 further comprising said throttle pedal switch to make or break current from said on-off switch to a said standstill switch and closes when said throttle pedal switch is in an idle position.

4. An apparatus according to claim 1 further comprising said standstill switch to make or break current from said throttle pedal switch to said solenoid control valve, said relay switch and said holding mode light and closes with vehicle at standstill.

5. An apparatus according to claim 1 further comprising said relay switch to make or break current from vehicle stop light circuit to said release brake light when pressure exists in said least loaded brake fluid passage.

6. An apparatus according to claim 1 further comprising said release brake light to indicate to operator to release brake.

7. An apparatus according to claim 1 further comprising said holding mode light to indicate to operator that vehicle is in holding mode.

8. An apparatus according to claim 1 further comprising said pressure grounding switch, a part of said solenoid control valve assembly, to provide electrical ground to said solenoid control valve, to said holding mode light, to said release brake light and also to prevent the activation of all such said components should the vehicle come to a standstill without the brake pedal having been activated due to some circumstance not anticipated.

* * * * *